3,647,737
NOVEL MIXTURES OF ACRYLIC MONOMERS AND
THE PREPARATION THEREOF
Rostyslaw Dowbenko and Roger M. Christenson, Gibsonia, Pa., assignors to PPG Industries, Inc., Pittsburgh, Pa.
No Drawing. Filed May 26, 1969, Ser. No. 827,974
Int. Cl. C08f 3/64, 15/16
U.S. Cl. 260—31.6
22 Claims

ABSTRACT OF THE DISCLOSURE

Novel acrylic monomers and mixtures of acrylic monomers are prepared by reacting a diol such as

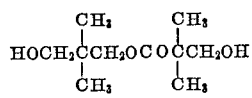

with an acrylic or methacrylic acid or their anhydrides or acid chlorides and a monofunctional aliphatic, alicyclic or aromatic acid. The reaction product is a mixture of monomers which may be copolymerized as such by subjecting it to ionizing irradiation, actinic light, or to free-radical catalysts and the resulting copolymer is a hard, mar-resistant and relatively flexible material, or the mixture may be separated into individual components which can be polymerized separately.

---

This invention in general deals with novel compounds which are highly radiation-sensitive. The novel acrylic compounds when subjected to low doses of ionizing irradiation or to actinic light or to free-radical catalysts polymerize to form extremely strong, stain-resistant materials. These cured materials show excellent resistance to the most stringent staining tests and are scratch-resistant, mar-resistant, and relatively flexible.

In our copending application Ser. No. 820,672 filed Apr. 30, 1969, it was disclosed that acrylic monomers formed by the reaction of diols having the general formula:

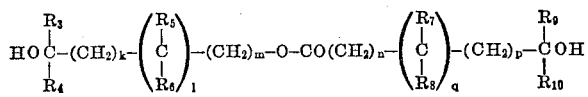

wherein $R_3$, $R_4$, $R_9$ and $R_{10}$ are selected from the group consisting essentially of H, alkyl, aryl, and cycloalkyl, substituted alkyl, substituted aryl, and substituted cycloalkyl groups. $R_5$, $R_6$, $R_7$, and $R_8$ are selected from the group consisting of H, alkyl, aryl, and cycloalkyl and $k$, $l$, $m$, $n$, $q$ and $p$ are whole numbers having values from 0 to 5, with acidic acrylic compounds such as acrylic acid and methacrylic acid have outstanding properties when polymerized. It has now been discovered that when the above diol and acrylic or methacrylic acid are coreacted with a monofunctional aliphatic, alicyclic, or aromatic acid, then the resulting monomers upon being polymerized, from polymers having the outstanding properties of the acrylic polymers described in U.S. application Ser. No. 820,672 and have the advantage of being more flexible than the polymers described in the aforementioned application, and also show improved adhesion to many materials. The degree of flexibility attained herein has heretofore been unobtainable using external flexibilizing aids and the increased flexibility greatly improves the properties of the resulting copolymers. The improved adhesion broadens the utility of the product as a coating material.

The novel monomers produced in accordance with this invention comprise compounds having the following formula:

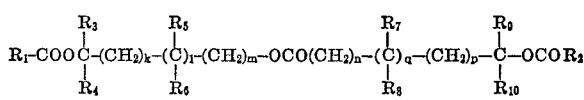

wherein $R_1$ and $R_2$ are selected from the group consisting of alkyl radicals preferably containing up to about 20 carbon atoms, such as methyl, ethyl, isobutyl and the like, aryl, and cycloalkyl, substituted alkyl, substituted aryl and substituted cycloalkyl groups. The alkyl groups may be of any length but the preferred alkyl radicals contain from 1 to 8 carbon atoms such as methyl, ethyl, isopropyl, hexyl, octyl, and the like. The preferred cycloalkyl groups contain from 5 to 8 carbon atoms such as cyclopentyl, cyclohexyl, cycloheptyl, and cyclooctyl. The preferred aryl groups contain up to 8 carbon atoms such as phenyl, benzyl, and the like. The alkyl, cycloalkyl, and aryl radicals may also be substituted with halogens, hydroxyls, etc. Examples of these radicals are chloropropyl, bromobenzyl, chlorocyclopentyl, hydroxyethyl, chlorooctyl, chlorophenyl, bromophenyl, hydroxyphenyl, and the like; and radicals having the formula:

wherein $R_{11}$ is selected from the group consisting of H, alkyl groups containing 1 to 2 carbon atoms, halo-substituted alkyl groups containing from 1 to 2 carbon atoms such as chloroethyl and the like and halogen such as chloro and bromo and wherein either $R_1$ or $R_2$ must be a radical having the formula

It is noted that only one of said $R_1$ and $R_2$ groups has the formula

$R_3$, $R_4$, $R_9$, and $R_{10}$ are selected from the group consisting of H, alkyl, aryl, cycloalkyl, substituted alkyl, substituted aryl and substituted cycloalkyl groups. Examples of the alkyl, aryl, cycloalkyl, substituted alkyl, substituted aryl, and substituted cycloalkyl groups are given in the description of $R_1$ and $R_2$ above.

The radicals $R_5$, $R_6$, $R_7$, and $R_8$ are selected from the group consisting of H, alkyl, aryl, and cycloalkyl. Examples of the alkyl, cycloalkyl and aryl radicals which may apply are given above under the discussion of $R_3$, $R_4$, $R_9$, and $R_{10}$.

It is noted that although $R_3$, $R_4$, $R_5$, $R_6$, $R_7$, $R_8$, $R_9$, and $R_{10}$ may be the same radicals each one of them may be different from the other as long as they fall under the general definition for each. That is to say, that while $R_3$ and $R_4$ may be H, $R_9$ may be ethyl, $R_{10}$ may be pentyl, $R_5$ and $R_6$ may be cyclohexyl, etc.

$k$, $l$, $m$, $n$, $q$, and $p$ are whole numbers having values from 0 to 5.

These monomers may be utilized as coating materials and may be coated and cured on various substrates in situ.

The method of preparing these monomers produces, before separation of the monomers, a highly useful mixture of monomers comprising:

(a) compounds having the formula listed above, where either $R_1$ or $R_2$ has the formula

(b) compounds having the formula listed above where neither $R_1$ or $R_2$ has the formula

and (c) compounds having the formula:

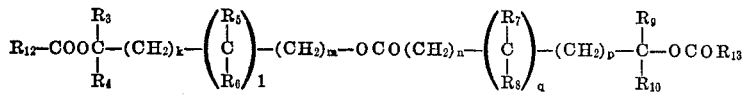

wherein $R_{12}$ and $R_{13}$ have the formula

wherein $R_{14}$ is selected from the group consisting of H, alkyl groups containing from 1 to 2 carbon atoms, halosubstituted alkyl groups containing from 1 to 2 carbon atoms, and halogen, and $R_3$ to $R_{10}$ and $k, l, m, n, p$ and $q$ are as described above.

As mentioned above, the three compounds may be separated from one another by known methods, such as fractional distillation, but for economic purposes it is generally advantageous to utilize the mixture of compounds. It is further noted that the mixture of compounds forms a highly desirable resinous material upon being polymerized as compounds (a) and (c) will copolymerize while compound (b) acts as a plasticizer.

The preferred monomers are those containing neopentyl structures such as acetoxypivalyl acryloxypivalate, butyryloxypivalyl acryloxypivalate, and stearyloxypivalyl acryloxypivalate as compound (a); acetoxypivalyl acetoxypivalate, 2-ethylhexoyloxypivalyl 2-ethylhexoyloxypivalate, benzoyloxypivalyl benzoyloxypivalate, and p-methylbenzoyloxypivalyl p-methylbenzoyloxypivalate as compound (b); and acryloxypivalyl acryloxypivalate and methacryloxypivalyl methacryloxypivalate as compound (c).

The monomer mixtures may comprise any proportion of the three components but the mixture generally comprises from about 30 to about 95 percent by weight of (a), from about 2.5 to about 35 percent by weight of (b) and from about 2.5 to about 35 percent by weight of (c).

The novel monomers described above may be formed by reacting (a) a compound selected from the group consisting of acrylic acid, methacrylic acid, acrylic anhydride, methacrylic anhydride and acid halides of acrylic and methacrylic acid or mixtures of any of these acidic acrylic compounds with (b), a diol having the general formula:

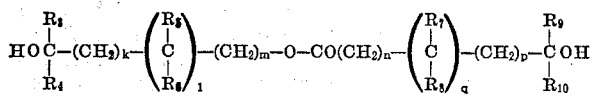

wherein $R_3$ to $R_{10}$, $k, l, m, n, p$ and $q$ are as described above and with (c) a monofunctional, aliphatic, alicyclic or aromatic acid.

The preferred acidic acrylic compound is acrylic acid and the preferred diol is hydroxypivalyl hydroxypivalate.

Any non-polymerizable, monofunctional aliphatic, alicyclic or aromatic acid may be used as the (c) reactant. This acid is not polymerizable by itself. Examples of such acids are: acetic acid, butyric acid, benzoic acid, propionic acid, caproic acid, 2-ethylhexoic acid, octanoic acid, lauric acid, stearic acid, neo acids such as neodecanoic acid and the like, oleic acid, cyclohexanecarboxylic acid, p-methylbenzoic acid, p-methoxybenzoic acid, p-nitrobenzoic acid, p-chlorobenzoic acid, chloroacetic acid, trichloroacetic acid, aminoacetic acid, and their anhydrides, and the like. The preferred non-polymerizable acids are acetic acid, butyric acid, 2-ethylhexanoic acid, and benzoic acid.

The molar ratio of acidic acrylic compound to diol may vary over a wide range but is generally from about 1.5:1 to about 1:5. It is preferred to use from about 1.5 to about 0.75 moles of acidic acrylic compound for every mole of diol. The remainder of the acidic component is the non-polymerizable (aliphatic, alicyclic or aromatic) acid in such an amount that the molar ratio of total acid to diol is from about 2:1 to about 10:1), preferably from about 2.0 to about 2.4 moles of total acid to 1 mole of diol.

The reaction is generally carried out at temperatures from about 50° C. to about 150° C. and preferably from about 95° C. to about 100° C.

The reaction is run in the presence of an acid catalyst such as sulfuric acid, p-toluenesulfonic acid, phosphoric acid, hydrochloric acid, and the like. The catalyst usually comprises from about 0.1 percent to about 5 percent by weight of the reactants.

In most cases a free-radical inhibitor is also used to prevent the reactants from polymerizing. Any free-radical inhibitor may be utilized such as hydroquinone, methylquinone. p-methoxyphenol, and the like. The inhibitor comprises from about 0.1 percent to about 5 percent by weight of the reactants.

The reaction is carried out by adding the diol, the acidic acrylic compound, the non-polymerizable acid, the catalyst if desired and the inhibitor if desired and heating to remove the water of esterification.

If desired, a solvent may be used to azeotrope the water resulting from the reaction. The reaction is driven to completion easier when the azeotroping solvent is used. Any aliphatic, cycloaliphatic, or aromatic hydrocarbon solvent may be used. Examples of solvents which are particularly useful are hexane, pentane, cyclopentane, cyclohexane, benzene, toluene, xylene, or mixtures of any of the above. The preferred solvent is cyclohexane. If it is desired to use the solvent, the reaction mixture may contain from about one percent to about 60 percent by weight of the solvent.

It is noted that the novel monomers prepared by the above-described process may be homopolymerized or copolymerized in the presence of free-radical catalysts by actinic light, or by irradiation. The novel compound may be copolymerized with other monomers such as acrylic monomers, such as alkyl acrylates and alkyl methacrylates, or may be added to other polymers and used as mixtures and co-cured together. Various polymers which may be added to the novel mixtures of acrylic monomers are polyalkyl acrylates, such as poly(ethyl acrylate), poly(2-ethylhexyl acrylate), and poly(butyl acrylate) and vinyl polymers and copolymers such as vinyl chloride-vinyl acetate copolymers. Cellulose polymers such as cellulose acetate butyrate may also be co-cured with the mixtures of acrylic monomers of this invention. Thus, the compounds of this invention may be mixed with other monomers or polymers and the mixture may then be co-cured either by using peroxide or by subjecting the mixture to actinic light or to ionizing irradiation. The preferred embodiments of this invention entail the curing of the novel monomers of this invention or of mixtures of the monomers by actinic light or by ionizing irradiation.

As the monomers prepared in this manner are extremely radiation-sensitive, and since radiation-sensitivity is both difficult to achieve and to predict, a feature of this invention is to polymerize the monomers herein by subjecting them to ionizing irradiation.

The term "irradiation," as used herein, means high energy radiation and/or the secondary energies resulting from conversion of electrons or other particle energy to X-rays or gamma radiation. While various types of irradiation are suitable for this purpose, such as X-rays and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation," which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in United States Pat. No. 2,763,609 and in British Pat. No. 762,953 are satisfactory for the practice of this invention.

The monomers described herein will polymerize acceptably using any total dosage between about 0.2 megarad and about 20 megarads. A "rad" is defined as that amount of radiation required to supply 100 ergs per gram of material being treated, and a "megarad" is $10^6$ rads. The total dosage is the total amount of irradiation received by the monomer. It has been found that the monomers of this invention will polymerize to hard, mar-resistant and stain-resistant films at a total dosage of less than 4 megarads. The preferable dosage used is from about 0.5 megarad to about 10 megarads.

The monomers and mixtures of monomers of this invention may also be polymerized and cured by a free-radical mechanism where free-radical catalysts are added and the monomers are heated to polymerize. Any conventional free-radical catalyst may be used, such as organic peroxides, organic hydroperoxides, or esters thereof. Examples are benzoyl peroxide, tertiary-butyl perbenzoate, tertiary-butyl hydroperoxide, cumene hydroperoxide, azobis(isobutyronitrile) and the like. The catalysts are generally used in amounts of about 0.1 percent to about 5 percent by weight of the monomer or mixture of monomers.

The monomers and catalysts may be heated to cure. Although curing temperatures will vary from monomer to monomer, generally temperatures from about 75° F. to about 300° F. are used to bring about the free-radical cure of the monomers.

In many instances, it may be desirable to polymerize without the addition of external heat in which cases it is customary to add an accelerator to the system. Suitable accelerators include cobalt salts, such as cobalt octoate or cobalt naphthenate and amine accelerators such as N,N-dimethylaniline, N - ethyl-N-hydroxyethyl-m-ethylaniline and N-propyl-N-hydroxyethyl-m-methylaniline.

The novel acrylic monomers may also be co-cured with various other copolymerizable ethylenically unsaturated monomers or with polymeric materials using the above-described free-radical mechanisms.

The polymers or copolymers formed by the polymerization of the new monomers of this invention have great utility as coatings for all types of substrates. They may be used as protective coatings for wood to form panels for walls, as coatings on plastics to form floor tiles, as coatings on metals such as aluminum and steel panels and as coatings for other substrates, and they have the advantage of having superior stain-resistance, scratch-resistance, mar-resistance, weather-resistance and chemical-resistance (to acids and bases) and the cured coatings have a high degree of crosslinking. These coatings are also relatively flexible and capable of forming strong bonds with various substrates.

The coatings may be formed by applying the monomer to a substrate by any conventional coating means, such as roller coating, curtain coating, brushing, spraying, etc. The coated article may then be cured either by adding peroxide to the coating or by subjecting the coating to actinic light or to ionizing irradiation. It is noted that many of the monomers have extremely low viscosity, thus insuring easy application if the product is to be used as a coating.

The use of ionizing irradiation to polymerize the monomers is preferred as this method makes it possible to polymerize the coatings at extremely high speeds and thus eliminate the time-consuming baking steps, and as the use of ionizing irradiation requires no heating, the danger of high temperatures damaging a heat-sensitive substrate is eliminated.

It is also noted that the use of ionizing irradiation requires no solvents, thus reducing the danger of poisonous and explosive solvent vapors and that the coatings formed by the use of ionizing irradiation are more highly cross-linked and are generally stronger coatings than the conventionally cured coatings.

The following examples set forth specific embodiments of the instant invention, however, the invention is not to be construed as being limited to these embodiments for there are, of course, numerous possible variations and modifications. All parts and percentages in the examples as well as throughout the specification are by weight unless otherwise indicated.

EXAMPLE 1

A reaction vessel was charged with 204 grams of hydroxypivalyl hydroxypivalate having the formula:

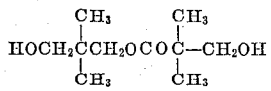

33 grams of acetic acid, 3.6 grams of hydroquinone, 1.8 grams of sulfuric acid and 50 grams of cyclohexane. The reactants were heated to reflux at 96° C. for 1 hour and 118.9 grams of acrylic acid were added dropwise over a period of one-half hour at 97° C. The reaction was continued at 97° C. for an additional 4½ hours during which time 70 cubic centimeters of cyclohexane were added and 30 grams of water were distilled off. The resultant monomer was obtained in a 92 percent yield after purification by washing. It had a hydroxy number of 11.93 and a Gardner-Holdt viscosity of A–.

EXAMPLE 2

A reaction vessel was charged with 204 grams of hydroxypivalyl hydroxypivalate, 143.3 grams of benzoic acid, 4.2 grams of hydroquinone, 2.1 grams of sulfuric acid, and 50 grams of cyclohexane. The reactants were heated to 100° C. for 5 hours and 40 minutes. To the reactants were then added dropwise 79.3 grams of acrylic acid over a period of 20 minutes at 97° C. The reaction was run at 96° C. for an additional 4½ hours. During the reaction, 120 cubic centimeters of cyclohexane were added and a total of 35.0 grams of water were distilled off. The resulting monomer was obtained in 86.3 yield after purification by washing. The product had a neutral acid number, a hydroxyl number of 31.71, and a Gardner-Holdt viscosity of D–E.

EXAMPLE 3

A reaction vessel was charged with 204 grams of hydroxypivalyl hydroxypivalate, 96.9 grams of butyric acid, 3.8 grams of hydroquinone, 1.9 grams of sulfuric acid, and 50 grams of cyclohexane and heated to 94° C. To the mixture were added 79.3 grams of acrylic acid over a period of one-half hour. The reaction was continued for 3 additional hours at 96° C. During the reaction, 70 cubic centimeters of cyclohexane were added and 38.9 grams of water were distilled off. The resulting product was obtained in 88.4 percent yields after purification by washing. The product had a neutral acid number, a hydroxyl number of 10.3 and a Gardner-Holdt viscosity of A–.

EXAMPLE 4

A reaction vessel was charged with 204 grams of hydroxypivalyl hydroxypivalate, 79.3 grams of 2-ethylhexoic acid, 4 grams of hydroquinone, 2 grams of sulfuric acid, and 50 grams of cyclohexane and heated at 99° C. for 3 hours and 10 minutes. At that time 118.9 grams of acrylic acid were added over a period of 30 minutes. The reaction was continued for 4 hours and 40 minutes. During the reaction 168 cubic centimeters of cyclohexane and 2 grams of sulfuric acid were added and 38 grams of water were distilled off. The resulting monomer was obtained in 88.5 percent yields after purification by washing. The product had a hydroxyl number of 32.31 and a Gardner-Holdt viscosity of A–.

EXAMPLE 5

A reaction vessel was charged with 204 grams of hydroxypivalyl hydroxypivalate, 158.6 grams of 2-ethylhexoic acid, 4.4 grams of hydroquinone, 2.2 grams of sulfuric acid, and 50 grams of cyclohexane and heated to 99° C. for 20 minutes. At this point, 79.3 grams of acrylic acid were added dropwise over a period of ½ hour. The reaction was continued for 5 hours at 98° C. During the reaction, 140 cubic centimeters of cyclohexane were added and 29.2 grams of water were distilled off. The resultant monomer was obtained in 71.9 percent yields after purification by washing. The product had an acid number of 5.56, a hydroxyl number of 53.84 and a Gardner-Holdt viscosity of A–.

EXAMPLE 6

The monomers of Examples 1, 3, 4 and 5 were each copolymerized by subjecting them to ionizing irradiation in the following manner:

The monomers were applied to aluminum panels and subjected to electron beam impingement at accelerating potentials of 400 kilovolts and tube currents of 16 milliamps. Each of the films received a total dosage of 4 megarads.

The cured films were found to have excellent mar-resistance and were relatively flexible.

EXAMPLE 7

The product of Example 1 was polymerized by the following method:

A steel plate is covered with a composition comprising 100 parts of the product of Example 1 (after the hydroquinone had been removed) and 1 part of cumene hydroperoxide. The composition was heated in a nitrogen atmosphere at 170° F. for 30 minutes. The resulting cured product was a hard, mar-resistant, stain-resistant, and relatively flexible film.

According to the provisions of the patent statutes, there is described above the invention and what are now considered to be its best embodiments. However, within the scope of the appended claims, it is to be understood that the invention can be practiced otherwise than is specifically described.

We claim:

1. A compound having the general formula

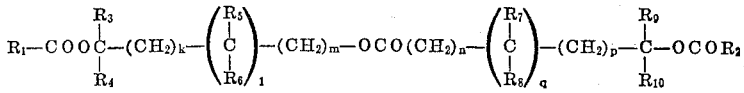

wherein $R_1$ and $R_2$ are selected from the group consisting of alkyl, aryl, cycloalkyl, substituted alkyl, substituted aryl, substituted cycloalkyl groups and radicals having the formula

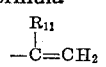

wherein $R_{11}$ is selected from the group consisting of H, alkyl groups containing from 1 to 2 carbon atoms, halo-substituted alkyl groups containing from 1 to 2 carbon atoms and halogen and wherein either $R_1$ or $R_2$ must be a radical having the formula

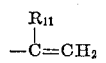

and only one of said $R_1$ and $R_2$ groups may have the formula

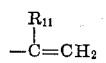

$R_3$, $R_4$, $R_9$, and $R_{10}$ are selected from the group consisting of H, alkyl, aryl, cycloalkyl, substituted alkyl, substituted aryl, and substituted cycloalkyl groups;

$R_5$, $R_6$, $R_7$, and $R_8$ are selected from the group consisting of H, alkyl, aryl, and cycloalkyl groups; and $k$, $l$, $m$, $n$, $p$, and $q$, are numerals having values from 0 to 5.

2. The compound of claim 1 wherein $R_2$ is an alkyl group.

3. The compound of claim 1 wherein $R_2$ has the formula

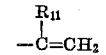

wherein $R_{11}$ is selected from the group consisting of H, alkyl groups containing from 1 to 2 carbon atoms, halo-substituted alkyl groups containing from 1 to 2 carbon atoms and halogen.

4. A mixture of compounds comprising (1) 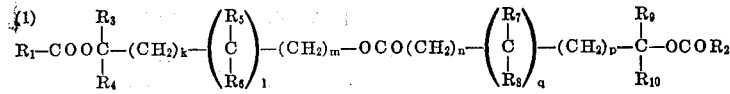

wherein $R_1$ and $R_2$ are selected from the group consisting of alkyl, aryl, cycloalkyl, substituted alkyl, substituted aryl, substituted cycloalkyl groups and radicals having the formula

where $R_{11}$ is selected from the group consisting of H, alkyl groups containing from 1 to 2 carbon atoms, halo-substituted alkyl groups containing from 1 to 2 carbon atoms and halogen and wherein either $R_1$ or $R_2$ must be a radical having the formula

and only one of said $R_1$ and $R_2$ groups may have the formula

$R_3$, $R_4$, $R_9$, and $R_{10}$ are selected from the group consisting of H, alkyl, aryl, cycloalkyl, substituted alkyl, substituted aryl, and substituted cycloalkyl groups;

$R_5$, $R_6$, $R_7$, and $R_8$ are selected from the group consisting of H, alkyl, aryl, and cycloalkyl groups; and $k$, $l$, $m$, $n$, $p$, and $q$ are numerals having values from 0 to 5;

(2) a compound having the general formula:

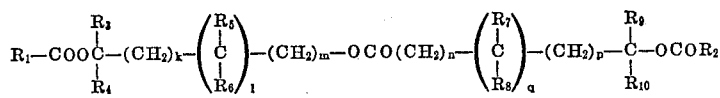

wherein $R_1$ and $R_2$ are selected from the group consisting of alkyl, aryl, cycloalkyl, substituted alkyl, substituted aryl and substituted cycloalkyl groups; and $R_3$, $R_4$, $R_5$, $R_6$, $R_7$, $R_8$, $R_9$, $R_{10}$, and
$k$, $l$, $m$, $n$, $p$, $q$ are as described above;

and (3) a compound having the general formula:

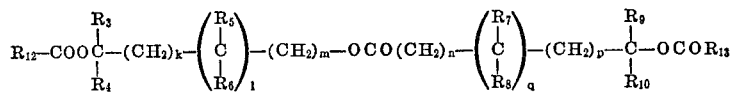

wherein $R_{12}$ and $R_{13}$ have the formula

wherein $R_{14}$ is selected from the group consisting of H, alkyl groups containing from 1 to 2 carbon atoms, halo-substituted alkyl groups containing from 1 to 2 carbon atoms, and halogen;

$R_3$, $R_4$, $R_5$, $R_6$, $R_7$, $R_8$, $R_9$, and $R_{10}$; and
$k$, $l$, $m$, $n$, $p$, and $q$ are as described above.

5. The mixture of claim 4 wherein compound (1) comprises from about 30 percent to about 95 percent by weight of the total mixture; compound (2) comprises from about 2.5 percent to about 35 percent by weight of the total mixture and compound (3) comprises from about 2.5 percent to about 35 percent by weight of the total mixture.

6. The mixture of claim 4 containing other copolymerizable monomers.

7. The mixture of claim 4 containing other polymeric materials.

8. The method of preparing a mixture of monomers comprising reacting (1) a compound having the formula

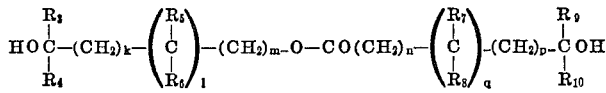

wherein $R_3$, $R_4$, $R_5$, and $R_6$ are selected from the group consisting of H, alkyl, aryl, cycloalkyl, substituted alkyl, substituted aryl, and substituted cycloalkyl groups;

$R_7$, $R_8$, $R_9$, and $R_{10}$ are selected from the group consisting of H, alkyl, aryl and cycloalkyl groups; and $k$, $l$, $m$, $n$, $p$, and $q$ are numerals having values from 0 to 5, with (2) a member of the group consisting of acrylic acid, methacrylic acid, and the acid anhydrides and acid chlorides of acrylic acid and methacrylic acid;

and (3) a member of the group consisting of aliphatic, alicyclic, and aromatic monofunctional acids which are not polymerizable by themselves.

9. The method of claim 8 wherein reactant (3) is a member selected from the group consisting of acetic acid, butyric acid, benzoic acid, and 2-ethylhexoic acid.

10. The method of claim 8 wherein the reaction is carried out at a temperature from about 50° C. to about 150° C.

11. The method of claim 8 wherein the acid catalyst and an inhibitor are present during the reaction.

12. The method of claim 8 wherein the molar ratios of compound (2) to compound (1) are from about 1.5:1 to about 1:5 and the molar ratio of total acid to diol is from about 2:1 to about 10:1.

13. The method of polymerizing the compound of claim 1 comprising subjecting the compound to ionizing irradiation.

14. The method of claim 13 wherein the compounds of claim 1 are subjected to from about 0.5 to about 10 megarads.

15. The method of co-curing the mixture of claim 4 comprising subjecting the mixture to ionizing irradiation.

16. The method of co-curing the mixture of claim 5 comprising subjecting the mixture to ionizing irradiation.

17. The method of copolymerizing the compound of claim 1 comprising subjecting the compound to actinic light.

18. The method of co-curing the mixture of claim 4 comprising subjecting the mixture to actinic light.

19. The mixture of co-curing the mixture of claim 5 comprising subjecting the mixture to actinic light.

20. The method of copolymerizing the compound of claim 1 by free-radical catalysis.

21. The method of co-curing the mixture of claim 4 by free-radical catalysis.

22. The method of co-curing the mixture of claim 5 by free-radical catalysis.

References Cited

UNITED STATES PATENTS

| | | | |
|---|---|---|---|
| 3,320,336 | 5/1969 | Duke et al. | 260—486 |
| 3,455,801 | 7/1969 | D'Alelio | 204—159.22 |
| 3,455,802 | 7/1969 | D'Alelio | 260—486 |
| 3,470,079 | 9/1969 | D'Alelio | 204—159.22 |

HARRY WONG, Jr., Primary Examiner

U.S. Cl. X.R.

117—128.4, 138.8, 148; 204—159.22; 260—13, 80.81, 86.1, 89.5, 478, 486, 884, 885

UNITED STATES PATENT OFFICE
CERTIFICATE OF CORRECTION

Patent No. 3,647,737  Dated March 7, 1972

Inventor(s) Rostyslaw Dowbenko et al

It is certified that error appears in the above-identified patent and that said Letters Patent are hereby corrected as shown below:

Column 1, line 62, "from" should be --form--.

Column 4, line 18, after "10:1" eliminate --)--.

Column 7, line 22, "143.3" should be --134.3--.

Claim 19, line 1, "mixture" (first occurrence) should be --method--.

Signed and sealed this 2nd day of January 1973.

(SEAL)
Attest:

EDWARD M. FLETCHER, JR.
Attesting Officer

ROBERT GOTTSCHALK
Commissioner of Patents